US012047746B2

(12) United States Patent
Johnson

(10) Patent No.: US 12,047,746 B2
(45) Date of Patent: Jul. 23, 2024

(54) AUDIO FEEDBACK REDUCTION SYSTEM FOR HEARING ASSISTANCE DEVICES, AUDIO FEEDBACK REDUCTION METHOD AND NON-TRANSITORY MACHINE-READABLE STORAGE MEDIUM

(71) Applicant: Starkey Laboratories, Inc., Eden Prairie, MN (US)

(72) Inventor: Andrew Joseph Johnson, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 110 days.

(21) Appl. No.: 17/755,244

(22) PCT Filed: Oct. 30, 2020

(86) PCT No.: PCT/US2020/070728
§ 371 (c)(1),
(2) Date: Apr. 25, 2022

(87) PCT Pub. No.: WO2021/087523
PCT Pub. Date: May 6, 2021

(65) Prior Publication Data

US 2022/0369045 A1 Nov. 17, 2022

Related U.S. Application Data

(60) Provisional application No. 62/927,950, filed on Oct. 30, 2019.

(51) Int. Cl.
*H04R 25/00* (2006.01)

(52) U.S. Cl.
CPC ......... *H04R 25/453* (2013.01); *H04R 25/554* (2013.01)

(58) Field of Classification Search
CPC ..... H04R 25/00; H04R 25/453; H04R 25/554
See application file for complete search history.

(56) References Cited

U.S. PATENT DOCUMENTS 6,021,207 A * 2/2000 Puthuff .................. H04B 1/385 381/328
2010/0232632 A1 9/2010 Kindred et al.
(Continued)

FOREIGN PATENT DOCUMENTS

WO WO-2021087523 A1 5/2021

OTHER PUBLICATIONS

"International Application Serial No. PCT/US2020/070728, International Search Report mailed Feb. 11, 2021", 5 pgs.
(Continued)

*Primary Examiner* — Suhan Ni
(74) *Attorney, Agent, or Firm* — Schwegman Lundberg & Woessner, P.A.

(57) ABSTRACT

To provide improved feedback reduction in hearing assistance devices, technical solutions described herein include remeasuring a feedback path and updating adaptive feedback cancellation parameters whenever a user receives and plays an audio stream signal. When the user converts the audio stream signal into an acoustic audio signal using a speaker within the hearing assistance device, a feedback portion of the acoustic audio signal may be fed back into the microphone of the hearing assistance device. The hearing assistance device can then compare the feedback portion to the received audio stream signal, and that comparison can be used to update adaptive feedback cancellation parameters within the hearing assistance device. When the hearing assistance device receives an acoustic audio input at the microphone, it may amplify that input and apply the received acoustic audio input based on the updated adaptive
(Continued)

feedback cancellation parameters to reduce or minimize feedback.

20 Claims, 3 Drawing Sheets

(56) References Cited

U.S. PATENT DOCUMENTS

| | | | | |
|---|---|---|---|---|
| 2013/0170660 | A1 | 7/2013 | Kristensen et al. | |
| 2014/0369537 | A1* | 12/2014 | Pontoppidan ........ | H04R 25/606<br>381/314 |
| 2016/0173999 | A1* | 6/2016 | Ungstrup ................ | H04W 4/80<br>381/315 |
| 2019/0069096 | A1* | 2/2019 | Petersen .............. | H04R 25/604 |

OTHER PUBLICATIONS

"International Application Serial No. PCT/US2020/070728, Written Opinion mailed Feb. 11, 2021", 7 pgs .

* cited by examiner

AUDIO FEEDBACK REDUCTION SYSTEM FOR HEARING ASSISTANCE DEVICES, AUDIO FEEDBACK REDUCTION METHOD AND NON-TRANSITORY MACHINE-READABLE STORAGE MEDIUM

CROSS-REFERENCE TO RELATED APPLICATION

This application is a U.S. National Stage Filing under 35 U.S.C. 371 from International Application No. PCT/US2020/070728, filed on Oct. 30, 2020, and published as WO 2021/087523, which claims the benefit of U.S. Provisional Application No. 62/927,950, filed Oct. 30, 2019, each of which are hereby incorporated by reference in their entirety.

TECHNICAL FIELD

Embodiments described herein generally relate to feedback cancellation in hearing devices.

BACKGROUND

Hearing assistance devices may encounter feedback, such as when the hearing assistance device input microphone captures part of the amplified audible signal intended for the user. Feedback may be more likely to occur as the hearing assistance device volume is increased, or if the hearing assistance device is moved closer to an acoustically reflecting surface. It is desirable to reduce or eliminate feedback for hearing assistance devices.

DESCRIPTION OF EMBODIMENTS

Figure 1:
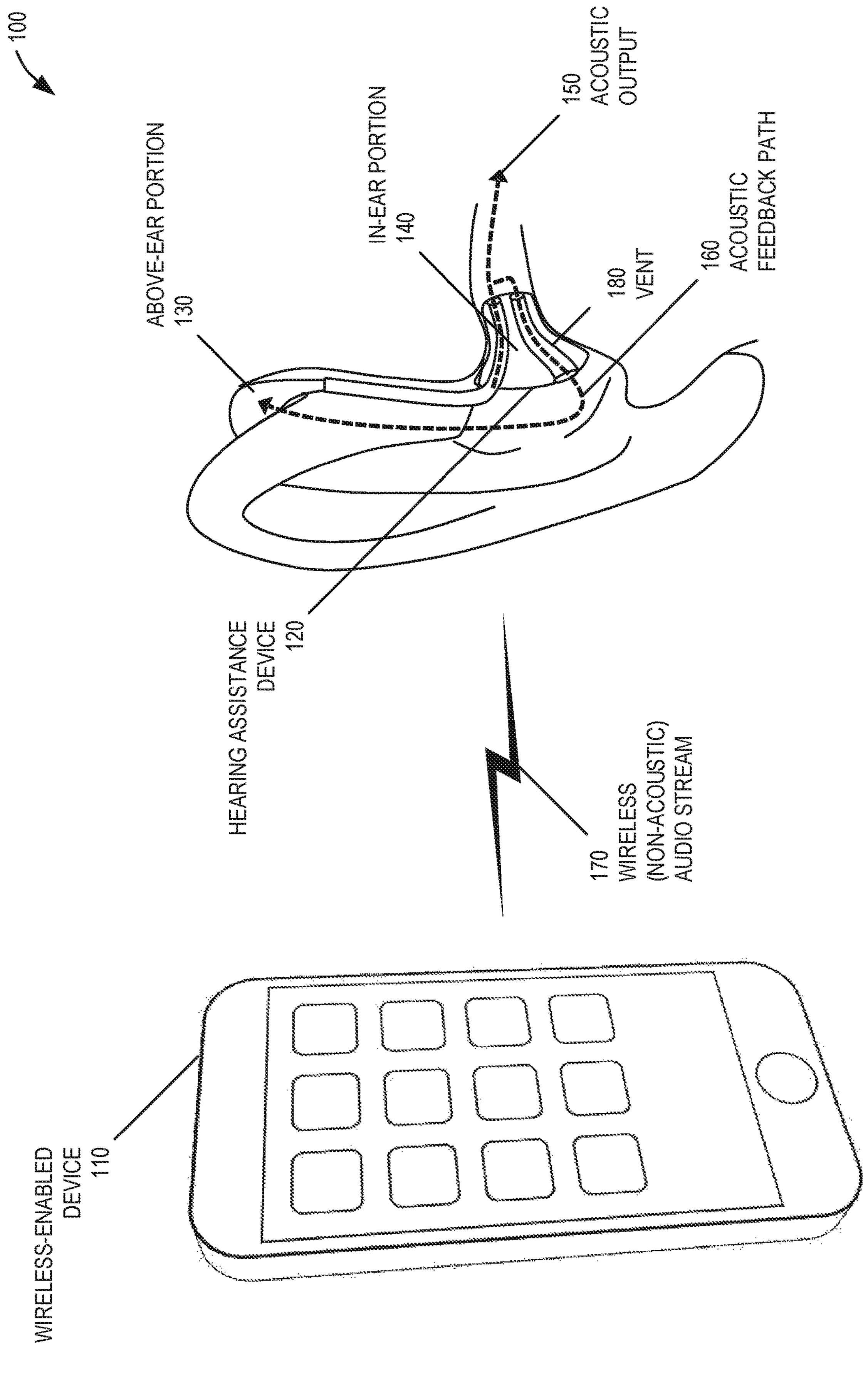
FIG. 1 is hearing assistance device feedback cancellation system, in accordance with at least one embodiment of the invention.

The subject matter described herein provides technical solutions to address technical problems facing feedback in hearing assistance devices. These technical solutions may include initializing a set of adaptive feedback cancellation parameters, and subsequently remeasuring a feedback path and updating the adaptive feedback cancellation parameters whenever a user receives and plays a non-acoustic audio signal. When the user converts the non-acoustic audio signal into an acoustic audio signal using a speaker within the hearing assistance device, a feedback portion of the acoustic audio signal may be fed back into the microphone of the hearing assistance device. In an example, the hearing assistance device may be playing the acoustic audio signal and not amplifying audio received from the microphone, but may still use the microphone to receive the feedback portion of the acoustic audio signal. The hearing assistance device can then compare the feedback portion to the received non-acoustic audio signal, and that comparison can be used to update adaptive feedback cancellation parameters within the hearing assistance device. The comparison may include comparing various signal characteristics between the feedback portion and the received non-acoustic audio signal, such as frequency content, phase information, amplitude, and other signal characteristics. When the hearing assistance device receives an acoustic audio input at the microphone, it may amplify that input and apply the received acoustic audio input based on the updated adaptive feedback cancellation parameters to reduce or minimize feedback. This provides the ability to continually update adaptive feedback cancellation parameters throughout the use of the hearing assistance device, which improves feedback cancellation in various acoustic environments and in various hearing assistance device usage configurations (e.g., to address daily variances in barometric pressure, hearing assistance device insertion depth, etc.).

In various examples, receipt and playback the non-acoustic audio signals may include streaming music from a smartphone, streaming audio from a television, streaming audio from a public announcement (PA) system, or other audio streaming. As used herein, streaming may include receipt and playback of a temporary audio file (e.g., streaming internet radio), an audio file (e.g., MP3 music), a digital or analog audio broadcast (e.g., FM radio, digital radio), a telecoil signal, a digital audio interface (DAI), or receipt and playback of other non-acoustic audio signals.

This description of embodiments of the present subject matter refers to subject matter in the accompanying drawings, which show, by way of illustration, specific aspects and embodiments in which the present subject matter may be practiced. These embodiments are described in sufficient detail to enable those skilled in the art to practice the present subject matter. References to "an," "one," or "various" embodiments in this disclosure are not necessarily to the same embodiment, and such references contemplate more than one embodiment. The above detailed description is demonstrative and not to be taken in a limiting sense. The scope of the present subject matter is defined by the appended claims, along with the full scope of legal equivalents to which such claims are entitled.

FIG. 1 is hearing assistance device feedback cancellation system 100, in accordance with at least one embodiment of the invention. System 100 may include a wireless-enabled device 110 and a hearing assistance device 120. The hearing assistance device 120 may include an above-ear portion 130 and an in-ear portion 140. In an example, the above-ear portion 130 may include an acoustic input transducer (e.g., microphone) for converting received acoustic audio into digital or analog audio signals.

A wireless, non-acoustic audio stream 170 may be transmitted from a wireless audio source to the hearing assistance device 120, which may be amplified and provided to a user as an acoustic output 150. A portion of the acoustic output 150 may be fed back to the microphone on the above-ear portion 130, such as via the example acoustic feedback path 160. There may be additional acoustic feedback paths, such as if a user moves an acoustically reflective surface (e.g., a phone) close to the ear.

The hearing assistance device 120 may compare the audio received at the microphone to the non-acoustic audio stream 170. This comparison may be used to identify and characterize feedback, and then used to update adaptive feedback cancellation parameters. Instead of attempting to distinguish which portion of received audible sounds (e.g., a person talking) are responsible for the feedback, any detected feedback is based on the hearing assistance device speaker reproducing the non-acoustic audio stream 170. This results in a significantly improved detection and characterization of feedback and updating of adaptive feedback cancellation parameters.

In addition to the comparison between the audio received at the microphone and the non-acoustic audio stream 170, additional information about the acoustic environment may be used to update adaptive feedback cancellation parameters. This additional information may include the geometry of the behind-the-ear (BTE) hearing assistance device 120 shown in FIG. 1, such as by determining a path length for acoustic feedback based on the distance between the speaker in the in-ear portion 140 and the microphone in the above-ear portion 130. For completely in-the-ear (ITE) hearing assistance devices, the information may also include a path length for acoustic feedback based on a distance between a speaker and a microphone. For hearing assistance devices that include a vent 180, this additional information may include the length and other physical and acoustic characteristics of the vent 180.

In various examples, the updating of adaptive feedback cancellation parameters may occur regardless of whether the microphone amplification path is active. The microphone amplification path may be inactive, such as when the user is streaming only an audio source and no sound received at the microphone is amplified and reproduced at the speaker. The microphone amplification path may be active while streaming audio, and the speaker may provide streaming audio while still amplifying and reproducing sound received from the microphone. In either case, the hearing assistance device may compare the sound received at the microphone to the non-acoustic audio signal to detect and characterize feedback, which may be used to update the adaptive feedback cancellation parameters. The comparison of the sound received at the microphone to the non-acoustic audio signal may be improved when the microphone amplification path is inactive due to a reduction in non-feedback audio received at the microphone. In some examples, the updating of adaptive feedback cancellation parameters occurs during periods when the microphone amplification path is active and during periods when the microphone amplification path is inactive. While technical solutions are described herein with respect to hearing assistance devices, these solutions may be applied to any audio device that includes a direct acoustic amplification path and an alternative non-acoustic input path.

Figure 2:
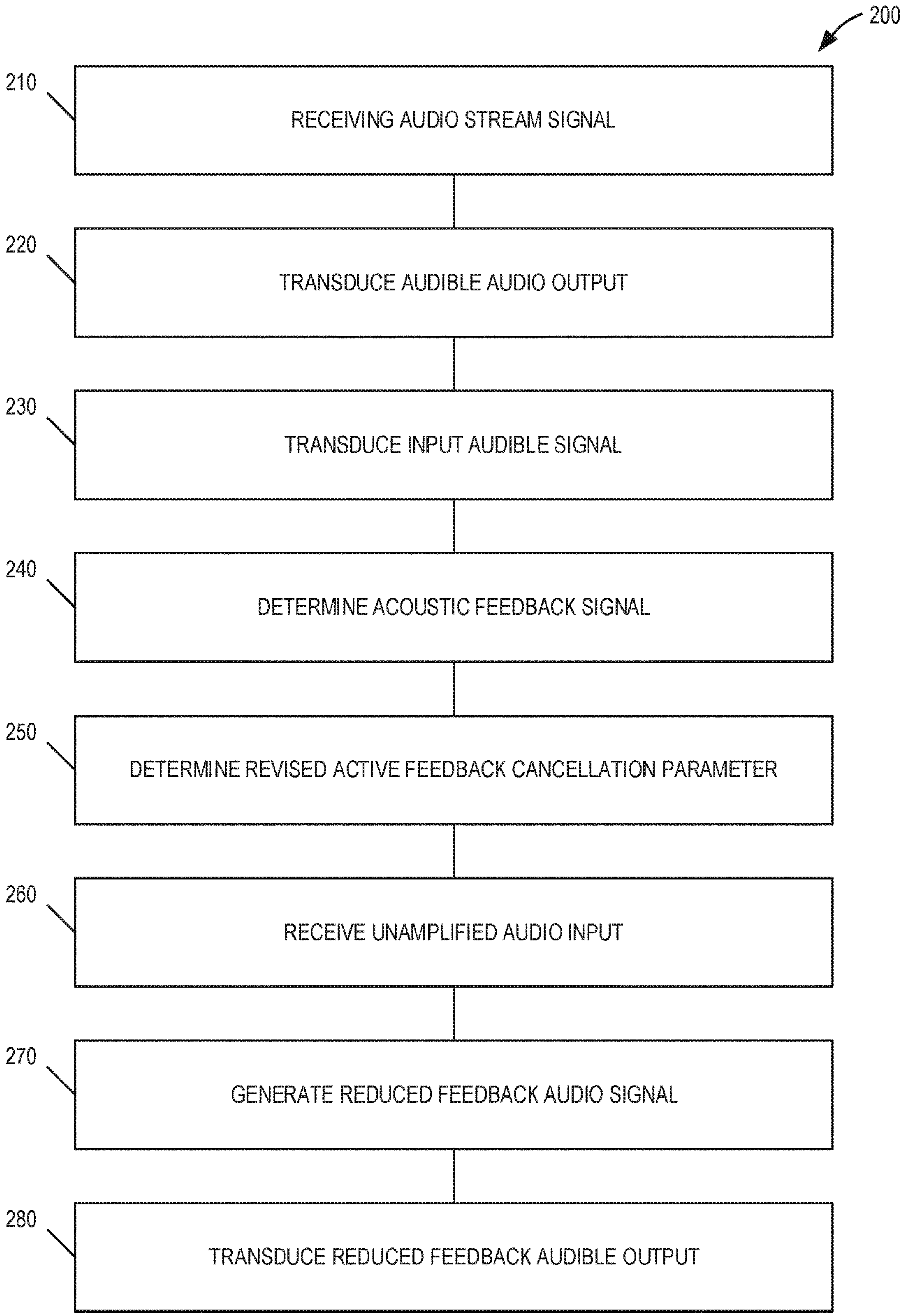
FIG. 2 is an audio feedback reduction method 200 for hearing assistance devices, in accordance with at least one embodiment of the invention.

FIG. 2 is an audio feedback reduction method 200 for hearing assistance devices, in accordance with at least one embodiment of the invention. Method 200 may include receiving 210 an audio stream signal at a hearing assistance device. Method 200 may include transducing 220 the reduced feedback audio signal into an audible audio output at a speaker at the hearing assistance device. Method 200 may include transducing 230 an audible input into an input audible signal at a microphone at the hearing assistance device, the audible input including a feedback portion of the audible audio output.

Method 200 may include determining 240 an acoustic feedback signal based on a comparison between the received audio stream signal and the input audible signal. Method 200 may include determining 250 a revised active feedback cancellation parameter based on the acoustic feedback signal. Method 200 may include receiving 260 an unamplified audio input at the microphone of the hearing assistance device. Method 200 may include generating 270 a reduced feedback audio signal based on the unamplified audio input and the revised active feedback cancellation parameter. The generation 270 of the reduced feedback audio signal may include generating a feedback cancellation signal based on the unamplified audio input and the revised active feedback cancellation parameter. The generation 270 of the reduced feedback audio signal may include subtracting the feedback cancellation signal from the unamplified audio input. Method 200 may include transducing 280 the reduced feedback audio signal into a reduced feedback audible output at the speaker at the hearing assistance device.

Figure 3:
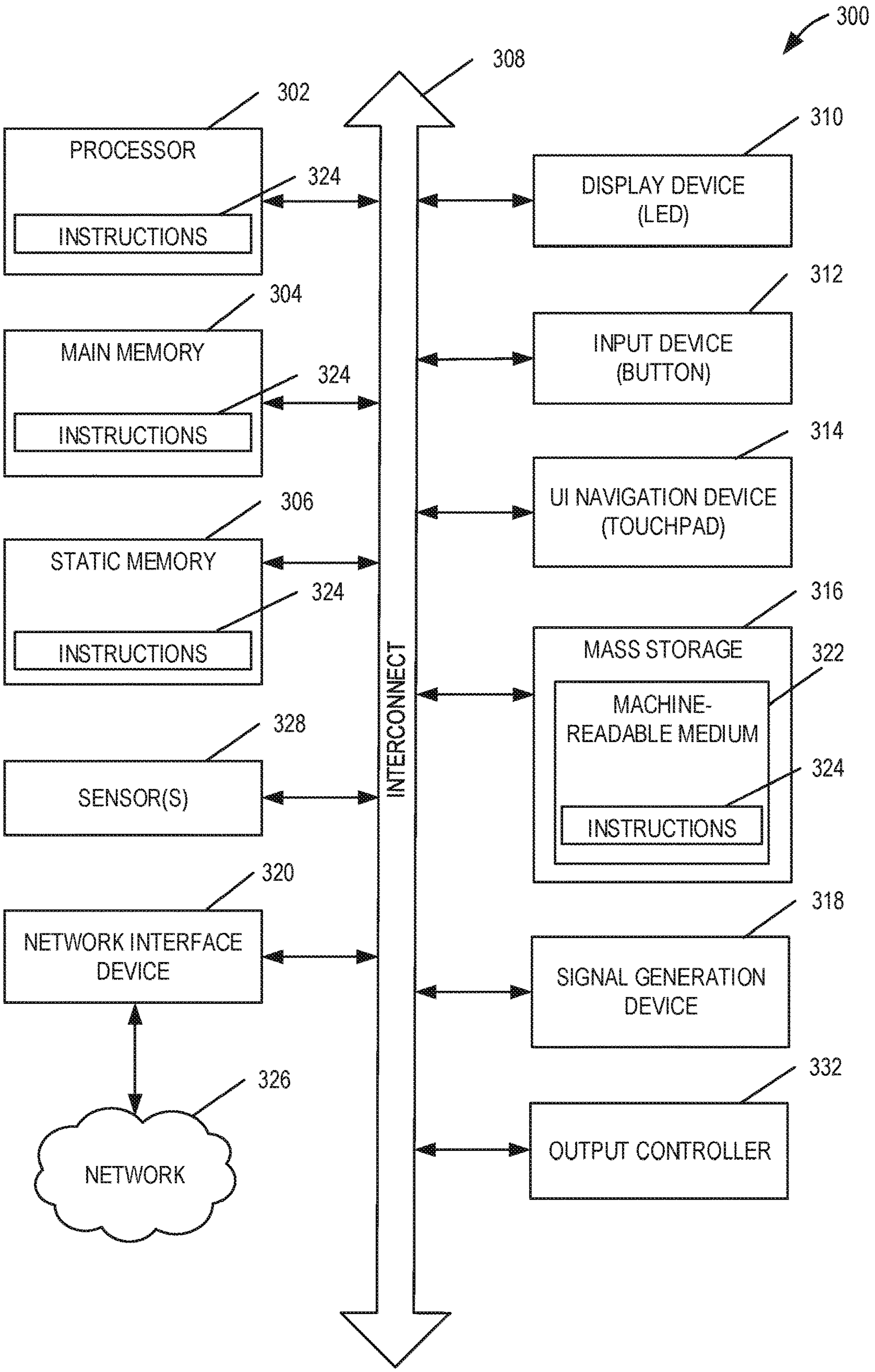
FIG. 3 illustrates a block diagram of an example machine upon which any one or more of the techniques discussed herein may perform.

FIG. 3 illustrates a block diagram of an example machine 300 upon which any one or more of the techniques (e.g., methodologies) discussed herein may perform. In alternative embodiments, the machine 300 may operate as a standalone device or may be connected (e.g., networked) to other machines. In a networked deployment, the machine 300 may operate in the capacity of a server machine, a client machine, or both in server-client network environments. In an example, the machine 300 may act as a peer machine in peer-to-peer (P2P) (or other distributed) network environment. The machine 300 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 300 may include a hardware processor 302 (e.g., a central processing unit (CPU), a graphics processing unit (GPU), a hardware processor core, or any combination thereof), a main memory 304 and a static memory 306, some or all of which may communicate with each other via an interlink (e.g., bus) 308. The machine 300 may further include a display unit 310, an alphanumeric input device 312 (e.g., a keyboard), and a user interface (UI) navigation device 314 (e.g., a mouse). In an example, the display unit 310, input device 312 and UI navigation device 314 may be a touch screen display. The machine 300 may additionally include a storage device (e.g., drive unit) 316, a signal generation device 318 (e.g., a speaker), a network interface device 320, and one or more sensors 321, such as a global positioning system (GPS) sensor, compass, accelerometer, or other sensor. The machine 300 may include an output controller 328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 316 may include a machine readable medium 322 on which is stored one or more sets of data structures or instructions 324 (e.g., software) embodying or utilized by any one or more of the techniques or functions described herein. The instructions 324 may also reside, completely or at least partially, within the main memory 304, within static memory 306, or within the hardware processor 302 during execution thereof by the machine 300. In an example, one or any combination of the hardware processor 302, the main memory 304, the static memory 306, or the storage device 316 may constitute machine readable media.

While the machine readable medium 322 is illustrated as a single medium, the term "machine readable medium" may include a single medium or multiple media (e.g., a centralized or distributed database, and/or associated caches and servers) configured to store the one or more instructions 324.

The term "machine readable medium" may include any medium that is capable of storing, encoding, or carrying instructions for execution by the machine 300 and that cause the machine 300 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 324 may further be transmitted or received over a communications network 326 using a transmission medium via the network interface device 320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 320 may include one or more physical jacks (e.g., Ethernet, coaxial, or phone jacks) or one or more antennas to connect to the communications network 326. In an example, the network interface device 320 may include a plurality of antennas to communicate wirelessly using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 300, and includes digital or analog communications signals or other intangible medium to facilitate communication of such software.

Various embodiments of the present subject matter may include a hearing assistance device. Hearing assistance devices typically include at least one enclosure or housing, a microphone, hearing assistance device electronics including processing electronics, and a speaker or "receiver." Hearing assistance devices may include a power source, such as a battery. In various embodiments, the battery may be rechargeable. In various embodiments multiple energy sources may be employed. It is understood that in various embodiments the microphone is optional. It is understood that in various embodiments the receiver is optional. It is understood that variations in communications protocols, antenna configurations, and combinations of components may be employed without departing from the scope of the present subject matter. Antenna configurations may vary and may be included within an enclosure for the electronics or be external to an enclosure for the electronics. Thus, the examples set forth herein are intended to be demonstrative and not a limiting or exhaustive depiction of variations.

It is understood that digital hearing aids include a processor. In digital hearing aids with a processor, programmable gains may be employed to adjust the hearing aid output to a wearer's particular hearing impairment. The processor may be a digital signal processor (DSP), microprocessor, microcontroller, other digital logic, or combinations thereof. The processing may be done by a single processor, or may be distributed over different devices. The processing of signals referenced in this application can be performed using the processor or over different devices. Processing may be done in the digital domain, the analog domain, or combinations thereof. Processing may be done using subband processing techniques. Processing may be done using frequency domain or time domain approaches. Some processing may involve both frequency and time domain aspects. For brevity, in some examples, drawings may omit certain blocks that perform frequency synthesis, frequency analysis, analog-to-digital conversion, digital-to-analog conversion, amplification, buffering, and certain types of filtering and processing. In various embodiments the processor is adapted to perform instructions stored in one or more memories, which may or may not be explicitly shown. Various types of memory may be used, including volatile and nonvolatile forms of memory. In various embodiments, the processor or other processing devices execute instructions to perform a number of signal processing tasks. Such embodiments may include analog components in communication with the processor to perform signal processing tasks, such as sound reception by a microphone, or playing of sound using a receiver (i.e., in applications where such transducers are used). In various embodiments, different realizations of the block diagrams, circuits, and processes set forth herein can be created by one of skill in the art without departing from the scope of the present subject matter.

Various embodiments of the present subject matter support wireless communications with a hearing assistance device. In various embodiments, the wireless communications can include standard or nonstandard communications. Some examples of standard wireless communications include, but not limited to, Bluetooth™, low energy Bluetooth, IEEE 802.11 (wireless LANs), 802.15 (WPANs), and 802.16 (WiMAX). Cellular communications may include, but not limited to, CDMA, GSM, ZigBee, and ultra-wideband (UWB) technologies. In various embodiments, the communications are radio frequency communications. In various embodiments, the communications are optical communications, such as infrared communications. In various embodiments, the communications are inductive communications. In various embodiments, the communications are ultrasound communications. Although embodiments of the present system may be demonstrated as radio communication systems, it is possible that other forms of wireless communications can be used. It is understood that past and present standards can be used. It is also contemplated that future versions of these standards and new future standards may be employed without departing from the scope of the present subject matter.

The wireless communications support a connection from other devices. Such connections include, but are not limited to, one or more mono or stereo connections or digital connections having link protocols including, but not limited to 802.3 (Ethernet), 802.4, 802.5, USB, ATM, Fiber-channel, Firewire or 1394, InfiniBand, or a native streaming interface. In various embodiments, such connections include all past and present link protocols. It is also contemplated that future versions of these protocols and new protocols may be employed without departing from the scope of the present subject matter.

In various embodiments, the present subject matter is used in hearing assistance devices that are configured to communicate with mobile phones. In such embodiments, the hearing assistance device may be operable to perform one or more of the following: answer incoming calls, hang up on calls, and/or provide two-way telephone communications. In various embodiments, the present subject matter is used in hearing assistance devices configured to communicate with packet-based devices. In various embodiments, the present subject matter includes hearing assistance devices configured to communicate with streaming audio devices. In various embodiments, the present subject matter includes hearing assistance devices configured to communicate with Wi-Fi devices. In various embodiments, the present subject matter includes hearing assistance devices capable of being controlled by remote control devices.

It is further understood that different hearing assistance devices may embody the present subject matter without departing from the scope of the present disclosure. The devices depicted in the figures are intended to demonstrate the subject matter, but not necessarily in a limited, exhaustive, or exclusive sense. It is also understood that the present subject matter can be used with a device designed for use in the right ear or the left ear or both ears of the wearer. The present subject matter may be employed in hearing assistance devices, such as headsets, hearing aids, headphones, and similar hearing devices. The present subject matter may be employed in hearing assistance devices having additional sensors. Such sensors include, but are not limited to, magnetic field sensors, telecoils, temperature sensors, accelerometers, and proximity sensors.

The present subject matter is demonstrated for hearing assistance devices, including hearing aids, including but not limited to, behind-the-ear (BTE), in-the-ear (ITE), in-the-canal (ITC), receiver-in-canal (RIC), or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user, including but not limited to receiver-in-canal (RIC) or receiver-in-the-ear (RITE) designs. The present subject matter can also be used in hearing assistance devices generally, such as cochlear implant type hearing devices and such as deep insertion devices having a transducer, such as a receiver or microphone, whether custom fitted, standard fitted, open fitted and/or occlusive fitted. It is understood that other hearing assistance devices not expressly stated herein may be used in conjunction with the present subject matter.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Example 1 is an audio feedback reduction system for hearing assistance devices, the system comprising: a memory; and a processor configured to execute instructions to: receive an audio stream signal at a hearing assistance device; transduce the audio stream signal into an audible audio output at a speaker at the hearing assistance device; transduce an audible input into an input audible signal at a microphone at the hearing assistance device, the audible input including a feedback portion of the audible audio output; determine an acoustic feedback signal based on a comparison between the received audio stream signal and the input audible signal; and determine a revised active feedback cancellation parameter based on the acoustic feedback signal.

In Example 2, the subject matter of Example 1 optionally includes wherein: the audio stream signal includes an associated audio stream duration; and the determination of the acoustic feedback signal is further based on an averaged comparison during the audio stream duration between the received audio stream signal and the input audible signal.

In Example 3, the subject matter of any one or more of Examples 1-2 optionally include wherein the audio stream duration is less than a full duration of the audio stream signal.

In Example 4, the subject matter of any one or more of Examples 1-3 optionally include the processor further configured to execute instructions to: receive an unamplified audio input at the microphone of the hearing assistance device; generate a reduced feedback audio signal based on the unamplified audio input and the revised active feedback cancellation parameter; and transduce the reduced feedback audio signal into a reduced feedback audible output at the speaker at the hearing assistance device.

In Example 5, the subject matter of any one or more of Examples 1-4 optionally include the processor further configured to execute instructions to: generate a feedback cancellation signal based on the unamplified audio input and the revised active feedback cancellation parameter; and generate a feedback cancelled output by subtracting the feedback cancellation signal from the unamplified audio input.

In Example 6, the subject matter of any one or more of Examples 1-5 optionally include wherein the audio stream signal includes a wireless audio stream signal received from a wireless media device.

In Example 7, the subject matter of any one or more of Examples 1-6 optionally include wherein the wireless media device includes at least one of a portable electronic device, a television audio streaming device, and a theater audio streaming device.

In Example 8, the subject matter of any one or more of Examples 1-7 optionally include wherein the audio stream signal includes at least one of a digital audio stream and an analog audio stream.

Example 9 is an audio feedback reduction method for hearing assistance devices, the method comprising: receiving an audio stream signal at a hearing assistance device; transducing the audio stream signal into an audible audio output at a speaker at the hearing assistance device; transducing an audible input into an input audible signal at a microphone at the hearing assistance device, the audible input including a feedback portion of the audible audio output; determining an acoustic feedback signal based on a comparison between the received audio stream signal and the input audible signal; and determining a revised active feedback cancellation parameter based on the acoustic feedback signal.

In Example 10, the subject matter of Example 9 optionally includes wherein: the audio stream signal includes an associated audio stream duration; and the determination of the acoustic feedback signal is further based on an averaged comparison during the audio stream duration between the received audio stream signal and the input audible signal.

In Example 11, the subject matter of any one or more of Examples 9-10 optionally include wherein the audio stream duration is less than a full duration of the audio stream signal.

In Example 12, the subject matter of any one or more of Examples 9-11 optionally include receiving an unamplified audio input at the microphone of the hearing assistance device; generating a reduced feedback audio signal based on the unamplified audio input and the revised active feedback cancellation parameter; and transducing the reduced feedback audio signal into a reduced feedback audible output at the speaker at the hearing assistance device.

In Example 13, the subject matter of any one or more of Examples 9-12 optionally include wherein the generation of the reduced feedback audio signal includes: generating a feedback cancellation signal based on the unamplified audio input and the revised active feedback cancellation parameter; and generating a feedback cancelled output by subtracting the feedback cancellation signal from the unamplified audio input.

In Example 14, the subject matter of any one or more of Examples 9-13 optionally include wherein the audio stream signal includes a wireless audio stream signal received from a wireless media device.

In Example 15, the subject matter of any one or more of Examples 9-14 optionally include wherein the wireless media device includes at least one of a portable electronic device, a television audio streaming device, and a theater audio streaming device.

In Example 16, the subject matter of any one or more of Examples 9-15 optionally include wherein the audio stream signal includes at least one of a digital audio stream and an analog audio stream.

Example 17 is one or more machine-readable medium including instructions, which when executed by a computing system, cause the computing system to perform any of the methods of Examples 9-16.

Example 18 is an apparatus comprising means for performing any of the methods of Examples 9-16.

Example 19 is at least one non-transitory machine-readable storage medium, comprising a plurality of instructions that, responsive to being executed with processor circuitry of a computer-controlled device, cause the computer-controlled device to: receive an audio stream signal at a hearing assistance device; transduce the audio stream signal into an audible audio output at a speaker at the hearing assistance device; transduce an audible input into an input audible signal at a microphone at the hearing assistance device, the audible input including a feedback portion of the audible audio output; determine an acoustic feedback signal based on a comparison between the received audio stream signal and the input audible signal; and determine a revised active feedback cancellation parameter based on the acoustic feedback signal.

In Example 20, the subject matter of Example 19 optionally includes wherein: the audio stream signal includes an associated audio stream duration; and the determination of the acoustic feedback signal is further based on an averaged comparison during the audio stream duration between the received audio stream signal and the input audible signal.

In Example 21, the subject matter of any one or more of Examples 19-20 optionally include wherein the audio stream duration is less than a full duration of the audio stream signal.

In Example 22, the subject matter of any one or more of Examples 19-21 optionally include receive an unamplified audio input at the microphone of the hearing assistance device; generate a reduced feedback audio signal based on the unamplified audio input and the revised active feedback cancellation parameter; and transduce the reduced feedback audio signal into a reduced feedback audible output at the speaker at the hearing assistance device.

In Example 23, the subject matter of any one or more of Examples 19-22 optionally include wherein the generation of the reduced feedback audio signal includes: generate a feedback cancellation signal based on the unamplified audio input and the revised active feedback cancellation parameter; and generate a feedback cancelled output by subtracting the feedback cancellation signal from the unamplified audio input.

In Example 24, the subject matter of any one or more of Examples 19-23 optionally include wherein the audio stream signal includes a wireless audio stream signal received from a wireless media device.

In Example 25, the subject matter of any one or more of Examples 19-24 optionally include wherein the wireless media device includes at least one of a portable electronic device, a television audio streaming device, and a theater audio streaming device.

In Example 26, the subject matter of any one or more of Examples 19-25 optionally include wherein the audio stream signal includes at least one of a digital audio stream and an analog audio stream.

Example 27 is an audio and data transmission apparatus for hearing assistance devices, the apparatus comprising: means for receiving an audio stream signal at a hearing assistance device; means for transducing the audio stream signal into an audible audio output at a speaker at the hearing assistance device; means for means for transducing an audible input into an input audible signal at a microphone at the hearing assistance device, the audible input including a feedback portion of the audible audio output; means for determining an acoustic feedback signal based on a comparison between the received audio stream signal and the input audible signal; and means for determining a revised active feedback cancellation parameter based on the acoustic feedback signal.

In Example 28, the subject matter of Example 27 optionally includes wherein: the audio stream signal includes an associated audio stream duration; and the determination of the acoustic feedback signal is further based on an averaged comparison during the audio stream duration between the received audio stream signal and the input audible signal.

In Example 29, the subject matter of any one or more of Examples 27-28 optionally include wherein the audio stream duration is less than a full duration of the audio stream signal.

In Example 30, the subject matter of any one or more of Examples 27-29 optionally include means for receiving an unamplified audio input at the microphone of the hearing assistance device; means for generating a reduced feedback audio signal based on the unamplified audio input and the revised active feedback cancellation parameter; and means for transducing the reduced feedback audio signal into a reduced feedback audible output at the speaker at the hearing assistance device.

In Example 31, the subject matter of any one or more of Examples 27-30 optionally include wherein the generation of the reduced feedback audio signal includes: means for generating a feedback cancellation signal based on the unamplified audio input and the revised active feedback cancellation parameter; and means for generating a feedback cancelled output by subtracting the feedback cancellation signal from the unamplified audio input.

In Example 32, the subject matter of any one or more of Examples 27-31 optionally include wherein the audio stream signal includes a wireless audio stream signal received from a wireless media device.

In Example 33, the subject matter of any one or more of Examples 27-32 optionally include wherein the wireless media device includes at least one of a portable electronic device, a television audio streaming device, and a theater audio streaming device.

In Example 34, the subject matter of any one or more of Examples 27-33 optionally include wherein the audio stream signal includes at least one of a digital audio stream and an analog audio stream.

Example 35 is one or more non-transitory machine-readable medium including instructions, which when executed by a machine, cause the machine to perform operations of any of the operations of Examples 1-34.

Example 36 is an apparatus comprising means for performing any of the operations of Examples 1-34.

Example 37 is a system to perform the operations of any of the Examples 1-34.

Example 38 s a method to perform the operations of any of the Examples 1-34.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. An audio feedback reduction system for hearing assistance devices, the system comprising:

a memory; and a processor configured to execute instructions to:

receive an audio stream signal at a hearing assistance device;

transduce the audio stream signal into an audible audio output at a speaker at the hearing assistance device;

transduce an audible input into an input audible signal at a microphone at the hearing assistance device without transducing the audible input into the audible audio output at the speaker at the hearing assistance device, the audible input including a feedback portion of the audible audio output;

determine an acoustic feedback signal based on a comparison between the received audio stream signal and the input audible signal; and determine a revised active feedback cancellation parameter based on the acoustic feedback signal.

2. The system of claim 1, wherein:

the audio stream signal includes an associated audio stream duration; and the determination of the acoustic feedback signal is further based on an averaged comparison during the audio stream duration between the received audio stream signal and the input audible signal.

3. The system of claim 2, wherein the audio stream duration is less than a full duration of the audio stream signal.

4. The system of claim 1, the processor further configured to execute instructions to:

receive an unamplified audio input at the microphone of the hearing assistance device;

generate a reduced feedback audio signal based on the unamplified audio input and the revised active feedback cancellation parameter; and transduce the reduced feedback audio signal into a reduced feedback audible output at the speaker at the hearing assistance device.

5. The system of claim 4, the processor further configured to execute instructions to:

generate a feedback cancellation signal based on the unamplified audio input and the revised active feedback cancellation parameter; and generate a feedback cancelled output by subtracting the feedback cancellation signal from the unamplified audio input.

6. The system of claim 1, wherein the audio stream signal includes a wireless audio stream signal received from a wireless media device.

7. The system of claim 6, wherein the wireless media device includes at least one of a portable electronic device, a television audio streaming device, and a theater audio streaming device.

8. The system of claim 1, wherein the audio stream signal includes at least one of a digital audio stream and an analog audio stream.

9. An audio feedback reduction method for hearing assistance devices, the method comprising:

receiving an audio stream signal at a hearing assistance device;

transducing the audio stream signal into an audible audio output at a speaker at the hearing assistance device;

transducing an audible input into an input audible signal at a microphone at the hearing assistance device without transducing the audible input into the audible audio output at the speaker at the hearing assistance device, the audible input including a feedback portion of the audible audio output;

determining an acoustic feedback signal based on a comparison between the received audio stream signal and the input audible signal; and determining a revised active feedback cancellation parameter based on the acoustic feedback signal.

10. The method of claim 9, wherein:

the audio stream signal includes an associated audio stream duration; and the determination of the acoustic feedback signal is further based on an averaged comparison during the audio stream duration between the received audio stream signal and the input audible signal.

11. The method of claim 10, wherein the audio stream duration is less than a full duration of the audio stream signal.

12. The method of claim 9, further including:

receiving an unamplified audio input at the microphone of the hearing assistance device;

generating a reduced feedback audio signal based on the unamplified audio input and the revised active feedback cancellation parameter; and transducing the reduced feedback audio signal into a reduced feedback audible output at the speaker at the hearing assistance device.

13. The method of claim 12, wherein the generation of the reduced feedback audio signal includes:

generating a feedback cancellation signal based on the unamplified audio input and the revised active feedback cancellation parameter; and generating a feedback cancelled output by subtracting the feedback cancellation signal from the unamplified audio input.

14. The method of claim 9, wherein the audio stream signal includes a wireless audio stream signal received from a wireless media device.

15. The method of claim 14, wherein the wireless media device includes at least one of a portable electronic device, a television audio streaming device, and a theater audio streaming device.

16. The method of claim 9, wherein the audio stream signal includes at least one of a digital audio stream and an analog audio stream.

17. At least one non-transitory machine-readable storage medium, comprising a plurality of instructions that, responsive to being executed with processor circuitry of a computer-controlled device, cause the computer-controlled device to:

receive an audio stream signal at a hearing assistance device;

transduce the audio stream signal into an audible audio output at a speaker at the hearing assistance device;

transduce an audible input into an input audible signal at a microphone at the hearing assistance device without transducing the audible input into the audible audio output at the speaker at the hearing assistance device, the audible input including a feedback portion of the audible audio output;

determine an acoustic feedback signal based on a comparison between the received audio stream signal and the input audible signal; and determine a revised active feedback cancellation parameter based on the acoustic feedback signal.

18. The non-transitory machine-readable storage medium of claim 17, wherein:

the audio stream signal includes an associated audio stream duration; and the determination of the acoustic feedback signal is further based on an averaged comparison during the audio stream duration between the received audio stream signal and the input audible signal.

19. The non-transitory machine-readable storage medium of claim 18, wherein the audio stream duration is less than a full duration of the audio stream signal.

20. The non-transitory machine-readable storage medium of claim 17, further including:

receive an unamplified audio input at the microphone of the hearing assistance device;

generate a reduced feedback audio signal based on the unamplified audio input and the revised active feedback cancellation parameter; and transduce the reduced feedback audio signal into a reduced feedback audible output at the speaker at the hearing assistance device.

* * * * *